United States Patent [19]

Kagawa et al.

[11] Patent Number: 4,477,476

[45] Date of Patent: Oct. 16, 1984

[54] METHOD FOR PROCESSING SALMON ROE PRODUCTS

[75] Inventors: Takahiko Kagawa, Tokyo; Yasuhiko Sasamoto, Kanagawa, both of Japan

[73] Assignee: Taiyo Fishery Co., Ltd., Tokyo, Japan

[21] Appl. No.: 453,826

[22] Filed: Dec. 28, 1982

[51] Int. Cl.³ .................. A23L 1/272; A23L 1/325
[52] U.S. Cl. ................................ 426/262; 426/643
[58] Field of Search ............ 426/262, 266, 268, 332, 426/643, 652, 654

[56] References Cited

U.S. PATENT DOCUMENTS

| | | | |
|---|---|---|---|
| 3,852,489 | 12/1974 | Yip | 426/643 X |
| 3,914,422 | 10/1975 | Chen | 426/643 X |
| 4,399,161 | 8/1983 | Nakamura et al. | 426/643 X |

FOREIGN PATENT DOCUMENTS

| | | | |
|---|---|---|---|
| 56-164769 | 12/1981 | Japan | 426/643 |
| 57-33575 | 2/1982 | Japan | 426/643 |
| 57-102136 | 6/1982 | Japan | 426/643 |

*Primary Examiner*—Robert Yoncoskie
*Attorney, Agent, or Firm*—Fleit, Jacobson, Cohn & Price

[57] ABSTRACT

Green salmon roe, whether it is very fresh or less than fresh, is salted under agitation in a saturated aqueous solution of salt containing a nitrite and being free from any precipitates, and is then dehydrated. The roe thus salted is immersed under agitation in a saturated aqueous solution of malate containing a nitrite and being free from any precipitates. The roe thus processed is worked up in the conventional manner.

2 Claims, No Drawings

METHOD FOR PROCESSING SALMON ROE PRODUCTS

BACKGROUND OF THE INVENTION

The present invention relates to an improved method for processing salmon roe products.

A sharp increase in the volume of salmon roe products delivered from North America, such as from U.S.A. and Canada, now contributes to a stable supply of processed salmon roe products in Japan. Although the situation is like this, a major problem with the processing of salmon roe products is how less fresh materials can satisfy two basic but contradictory requirements of the finished products, namely, the less salty taste and hardness, which are usually obtainable with fresh materials.

The material egg for salmon roe products (hereafter called "green egg" which specifically indicates the untreated material roe for further processing), which has lost some of its freshness may not be processed in a conventional manner applicable to very fresh green egg, since it provides a sweet but soft product. To harden such a product, it had to be stirred in a saturated aqueous solution of salt containing nitrite(s) for a longer period that the period required for very fresh green egg, and to be sprinkled with a larger amount of salt when packed in a case.

However, the products thus finished are avoided by consumers due to their higher salt content and their stickiness to teeth. A recent low-salt food campaign also contributes to the aversion for such high-salt food.

SUMMARY OF THE INVENTION

The present invention aims at a providing solution to the above-mentioned problems.

More specifically, a main object of the present invention is to provide an improved method for processing salmon roe products, with which a product excelling in both appearance and hardness is obtainable from green egg, whether it is very fresh or less fresh.

Another object of the invention is to provide a more simplified method for processing green egg.

DESCRIPTION OF THE PREFERRED EMBODIMENTS

The foregoing and other objects and features of the present invention will become apparent from a reading of the following detailed description of the preferred embodiments of the invention.

An amount of green egg is first washed in, e.g., brine, to remove pieces of the salmon internals and other impurities, if present. The egg is then retained in a basket for 5 to 60 minutes to remove water therefrom and, subsequently placed in a first tank charged with a saturated aqueous solution of salt containing a nitrite(s) and being free from any precipitates, where it is salted under agitation for 5 to 40 minutes. Thereafter, the basket is taken out of the first tank to subject it to a dehydration treatment for 5 to 60 minutes, and placed in a second tank charged with a saturated aqueous solution of malate containing a nitrite(s) and being free from any precipitates, in which the egg is immersed under agitation for 5 to 60 minutes.

The green egg thus treated, is worked up in the known manner, i.e, dehydrated, sorted and packed in a case.

The salmon roe products processed according to the present invention have a lower content of salt and are considerably superior in hardness to that processed according to the prior art, even when the green egg used has lost some of its freshness.

Repeated testing has uncovered a disadvantage in the method for processing green egg in which the egg is salted under the agitation in a saturated aqueous solution of salt and a saturated aqueous solution of malate which are charged in the same tank. The disadvantage is that the offensive properties of malate, such as offensive odor and poor taste, may remain in the product depending upon whether salt or malate is first charged in the tank, due to a difference between their solubilities in water.

It has now been found that a product excelling in both salt content and taste is obtained, if one resorts to the system in which the green egg is stirred in a first tank followed by dehydration, and again stirred in a second tank.

With the conventional manner, an amount of salt precipitates in the lower portion of the tank used. The salt precipitates are diffused in the tank during stirring, and have an unstable influence upon the quality of processed salmon roe products. According to the present invention, this problem is solved by using only the supernatant liquids obtained from the saturated aqueous solutions of salt and malate by decantation, or removing the precipitates therefrom by filtration.

In accordance with the present invention, the nitrite(s) is added to the saturated aqueous solutions of salt and malate as coloring matter which imparts to the product a scarlet coloring peculiar to salmon roe products. For instance, the product obtained with the nitrite-containing solutions is by far superior in appearance (color) to that obtained with the nitrite-free solutions, although there is no difference in hardness and taste.

The present invention will now be explained further with reference to the following, non-restrictive examples.

EXAMPLE 1

A sample of five kg was taken from ten kg of frozen red salmon green egg produced in Alaska, thawed out, and salted under agitation for 10 minutes in a saturated aqueous solution of salt obtained by decantation, which solution contained 150 ppm of sodium nitrite and was free from any precipitates. The salted product was dehydrated for 5 minutes and immersed under agitation for 15 minutes in a saturated aqueous solution of malate (manufactured by FUSCO KAGAKU K.K.) obtained in a similar manner, which solution contained 150 ppm of sodium nitrite and was free from any precipitates. The egg was dehydrated for 30 minutes, packed in a case, and aged under the action of a weight for 4 days. In this manner, a salmon roe product A was prepared.

For the purpose of comparison, the remaining five kg of the red salmon green egg were thawed out, salted under agitation for 25 minutes in a conventionally saturated aqueous solution of salt containing 150 ppm of the nitrite and precipitates, dehydrated for 30 minutes, packed in a case, and aged under the action of a weight for 4 days. In this manner, a salmon roe product B was prepared.

The A and B products had a salt content, upon aging, of 5.9% and 10.72%, respectively, measured according to Mohr's Method.

The A and B products were judged by a ten-man panel according to a scale of evaluation from one to five. The results were as follows:

|   | Hardness | Salty Taste | Taste | Color | Averaged |
|---|---|---|---|---|---|
| A | 3.6 | 3.4 | 3.7 | 3.7 | 3.6 |
| B | 2.0 | 1.2 | 1.1 | 2.5 | 1.7 |

EXAMPLE 2

A sample of five kg was taken from ten kg of frozen pink salmon green egg produced in Alaska, thawed out, and processed into a product C in a manner similar to that described for product A in Example 1.

The remaining five kg of egg were processed into a control product D in a manner similar to that for product B mentioned in Example 1.

The C and D products had a salt content, upon aging, of 6.72% and 11.49%, respectively, measured according to Mohr's Method. The C and D products were judged by a ten-man panel according to a scale of evaluation from one to five. The results were:

|   | Hardness | Salty Taste | Taste | Color | Averaged |
|---|---|---|---|---|---|
| C | 3.5 | 3.7 | 3.7 | 3.6 | 3.6 |
| D | 2.0 | 2.1 | 2.1 | 2.9 | 2.3 |

EXAMPLE 3

A sample of five kg was taken from ten kg of green egg produced in Alaska, thawed out, and salted under agitation for 5 minutes in a saturated aqueous solution of salt obtained by filtration through a cotton canvas cloth, which solution contained 150 ppm of sodium nitrite and was free form any precipitates. The salted product was dehydrated for 3 minutes and immersed under agitation for 10 minutes in a saturated aqueous solution of malate (manufactured by FUSO KAGAKU K.K.) obtained in a similar manner, which solution contained 150 ppm of sodium nitrite and was free from any precipitates. The roe was dehydrated for 15 minutes, packed in a case, and aged under the action of a weight for 4 days. In this manner, a salmon roe product E was prepared.

For the purpose of comparison, the remaining 5 kg of green egg were thawed out, salted under agitation for 25 minutes in a conventionally saturated aqueous solution of salt containing 150 ppm of sodium nitrite and precipitates, dehydrated for 20 minutes, packed in a case, and aged under the action of a weight for 4 days. In this manner, a salmon rose product F was prepared.

The E and F products had a salt content, upon aging, of 4.9% and 9.5%, respectively, measured according to Mohr's Method.

The E and F products were judged by a ten-man panel according to a scale of evaluation from one to five. The results are as follows:

|   | Hardness | Salty Taste | Taste | Color | Averaged |
|---|---|---|---|---|---|
| E | 4.0 | 4.0 | 4.2 | 3.6 | 4.0 |
| F | 3.4 | 3.2 | 3.0 | 3.2 | 3.2 |

EXAMPLE 4

A sample of five kg was taken from the ten kg of green egg produced in Hokkaido, Japan, and was processed into a product G in a manner similar to that described for product E in Example 3.

The remaining five kg of egg were processed into a control product H in a manner similar to that for product F mentioned in Example 3.

The G and H products had a salt content, upon aging, of 5.1% and 8.9%, respectively, measured according to Mohr's Method. The G and H products were judged by a ten-man panel according to a scale of evaluation from one to five. The results were:

|   | Hardness | Salty Taste | Taste | Color | Averaged |
|---|---|---|---|---|---|
| G | 4.1 | 4.0 | 4.0 | 3.8 | 4.0 |
| H | 3.5 | 3.2 | 3.8 | 3.5 | 3.5 |

EXAMPLE 5

A sample of five kg was taken from ten kg of green egg produced in Hokkaido, Japan, and was processed into a product I in a manner similar to that described for product E in Example 3.

The remaining five kg of egg were processed into a control product J in a manner similar to that for product F mentioned in Example 3, provided that 150 ppm of sodium nitrite was not applied.

The I and J products were judged by a ten-man panel according to a scale of evaluation from one to five. The results were:

|   | Hardness | Salty Taste | Taste | Color | Averaged |
|---|---|---|---|---|---|
| I | 4.0 | 3.7 | 3.4 | 3.8 | 3.7 |
| J | 3.7 | 3.8 | 3.6 | 2.1 | 3.3 |

EXAMPLE 6

A sample of five kg was taken from ten kg of pink salmon green egg produced in Alaska and was salted under agitation for 5 minutes in a saturated aqueous solution of salt which contained 150 ppm of sodium nitrite and was free from any precipitates. The salted product was dehydrated for 3 minutes and immersed under agitation for 10 minutes in a saturated aqueous solution of malate (manufactured by FUSO KAGAKU K.K.), which solution contained 150 ppm of sodium nitrite and was free from any precipitates. The egg was dehydrated for 15 minutes, packed in a case, and aged under the action of a weight for 4 days. In this manner, a salmon roe product K was prepared.

For the purpose of comparison, the remaining five kg of pink salmon green egg were salted under agitation for 25 minutes in a conventionally saturated aqueous solution of salt containing 150 ppm of sodium nitrite and including precipitates, said solution being added with 3 to 5% of malate, dehydrated for 20 minutes, packed in a case, and aged under the action of a weight for 4 days. In this manner, a salmon roe product L was prepared.

The K and L products had a salt content, upon aging, of 5.2% and 6.8%, respectively, measured according to Mohr's Method.

The K and L products were judged by a ten-man panel according to a scale of evaluation from one to five. The results were as follows:

|   | Hardness | Salty Taste | Taste | Color | Averaged |
|---|---|---|---|---|---|
| K | 4.2 | 3.8 | 3.9 | 3.5 | 3.8 |

| | Hardness | Salty Taste | Taste | Color | Averaged |
|---|---|---|---|---|---|
| L | 3.0 | 3.5 | 3.4 | 3.5 | 3.3 |

What is claimed is:

1. A method for processing salmon green egg, that is, previously untreated salmon roe into a salmon roe product, said method comprising:

salting said green egg under agitation in a saturated aqueous solution of salt containing a quantity of nitrite sufficient to impart a scarlet coloring to said roe product and being free from any precipitates; drying said salted egg; and immersing said dried, salted egg under agitation in a saturated aqueous solution of malate containing a quantity of nitrite sufficient to impart a scarlet coloring to said roe product and being free from any precipitates.

2. A method according to claim 1, wherein the quantity of nitrite in each of said solutions is from about 100 to about 200 ppm.

* * * * *